(12) United States Patent
Hishida

(10) Patent No.: US 6,874,306 B2
(45) Date of Patent: Apr. 5, 2005

(54) HAND-PUSHED MOWER

(75) Inventor: Tadashi Hishida, Sakai (JP)

(73) Assignee: VIV Engineering Inc., Sakai (JP)

( * ) Notice: Subject to any disclaimer, the term of this patent is extended or adjusted under 35 U.S.C. 154(b) by 0 days.

(21) Appl. No.: 10/190,527

(22) Filed: Jul. 9, 2002

(65) Prior Publication Data

US 2003/0024227 A1 Feb. 6, 2003

(30) Foreign Application Priority Data

| Aug. 3, 2001 | (JP) | ................................. 2001-236579 |
| Nov. 20, 2001 | (JP) | ................................. 2001-355085 |
| Mar. 19, 2002 | (JP) | ................................. 2002-076186 |
| Apr. 1, 2002 | (JP) | ................................. 2002-098660 |

(51) Int. Cl.[7] ............................................. A01D 34/68
(52) U.S. Cl. ................................. 56/12.7; 56/17.5
(58) Field of Search ............................. 56/12.7, 17.1, 56/17.2, 17.5

(56) References Cited

U.S. PATENT DOCUMENTS

| 1,486,758 A | * | 3/1924 | Jerram ........................ 56/249.5 |
| 1,657,514 A | * | 1/1928 | Miller ......................... 180/19.1 |
| 2,676,448 A | * | 4/1954 | Limberger .................... 56/12.7 |
| 2,972,162 A | * | 2/1961 | Townsend ....................... 16/26 |
| 4,411,126 A | * | 10/1983 | Lowry et al. ................ 56/17.5 |
| 4,679,383 A | * | 7/1987 | Quintel ........................ 56/13.4 |
| 4,936,886 A | * | 6/1990 | Quillen ........................ 56/16.7 |
| 5,042,882 A | * | 8/1991 | Kuhn et al. ................ 301/124.1 |
| 5,259,175 A | * | 11/1993 | Schmidt ....................... 56/17.2 |
| 5,459,985 A | * | 10/1995 | Gedert ......................... 56/17.2 |
| 5,518,682 A | * | 5/1996 | Markling et al. ........... 264/516 |
| 5,906,051 A | * | 5/1999 | Nannen ......................... 30/276 |

* cited by examiner

Primary Examiner—Robert E. Pezzuto
Assistant Examiner—Meredith Petravick
(74) Attorney, Agent, or Firm—Armstrong, Kratz, Quintos, Hanson & Brooks, LLP

(57) ABSTRACT

A hand-pushed mower provided with a frame holding an engine, a wheel disposed under a lower end of the frame, a handle disposed on an upper end of the frame, and a mowing blade disposed in front of the wheel and rotated by the engine, wherein the wheel is formed into a barrel-shaped configuration.

14 Claims, 18 Drawing Sheets

HAND-PUSHED MOWER

BACKGROUND OF THE INVENTION

1. Field of the Invention

This invention relates to a hand-pushed mower.

2. Description of the Related Art

As a conventional hand-pushed mower, a mower provided with a frame holding an engine, a pair of wheels disposed on a lower end of the frame, a handle disposed on an upper end of the frame, and a mowing blade disposed in front of the pair of wheels and rotated by the engine, is known.

In mowing with the hand-pushed mower, a worker, holding the handle to keep the mowing blade at a regular height, pushes the mower with hands to proceed, and swings the handle in lateral direction to swing the rotating mowing blade for a wide mowing track.

However, in this conventional hand-pushed mower, the mower can not proceed smoothly with hand pushing because the wheel tends to get into concave portions on rough ground for a small width (thickness) of the wheel, and it is difficult to conduct mowing in a wide track even with swinging the handle because the handle is disposed at a high position. The mower is difficult to manage when the worker is not highly skilled because operation of the mower is difficult and dangerous, for above-described reasons.

It is therefore an object of the present invention to provide a hand-pushed mower with which mowing can be conducted safely and easily without high skill. It is another object to provide a wheel with concavo-convex patterns to cope with the rough ground. And, it is still another object to provide a hand-pushed mower provided with a wheel which is lightweight, hard to damage, and produced with low cost.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
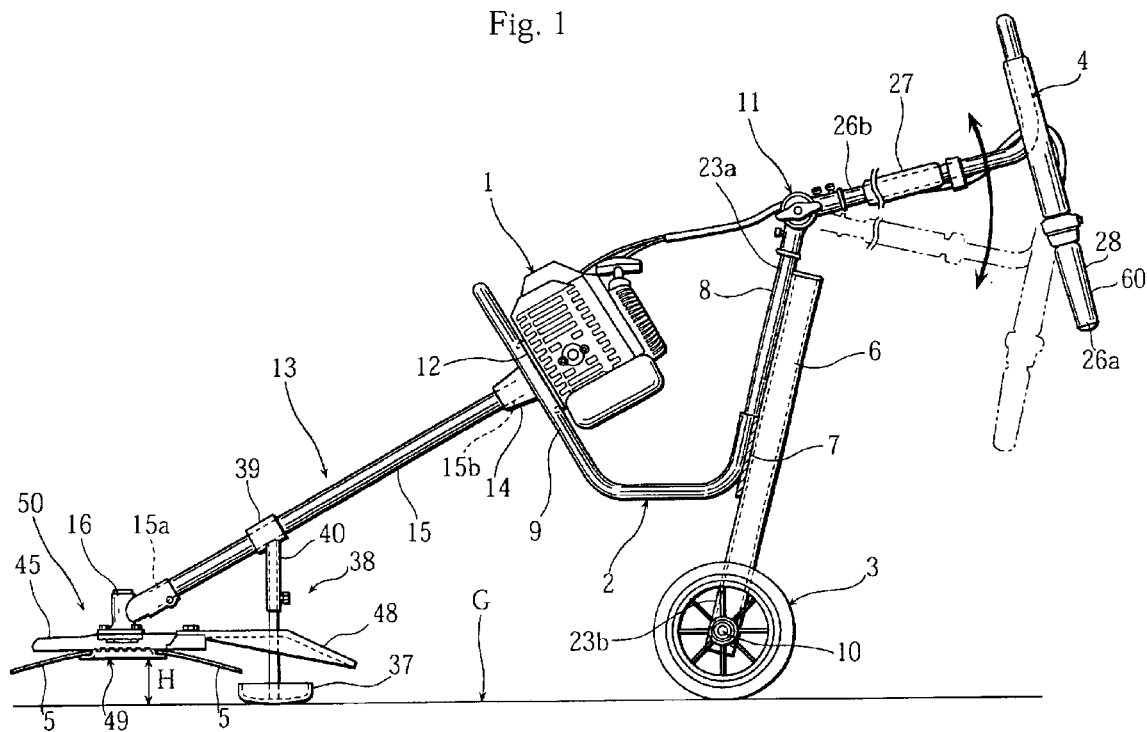
FIG. 1 is a side view showing a first embodiment of the present invention.
Figure 2:
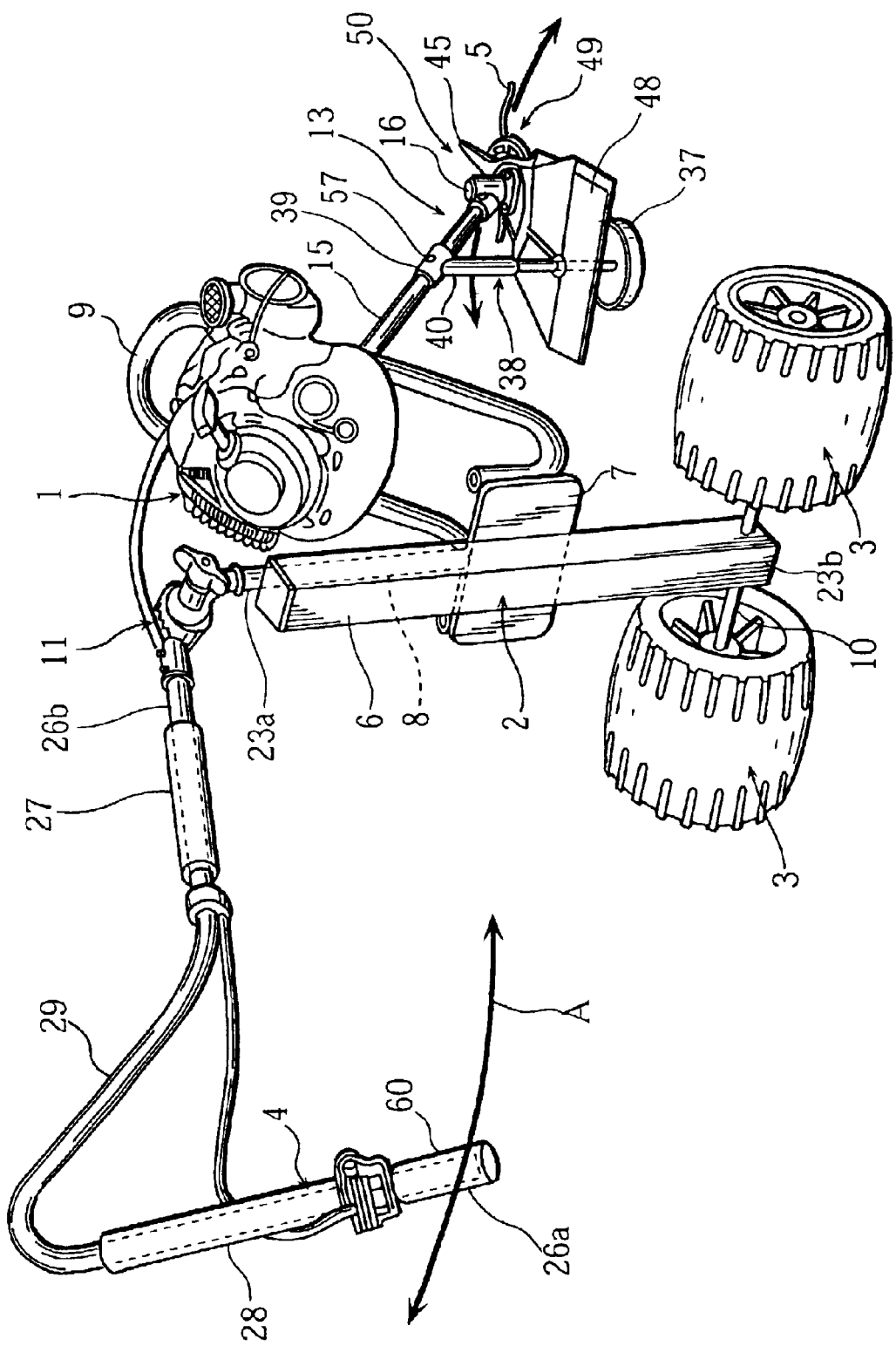
FIG. 2 is a perspective view of a hand-pushed mower observed obliquely from behind.

FIG. 1 and FIG. 2 show a first embodiment of the present invention. As shown in a side view of FIG. 1 and a perspective view of FIG. 2, a hand-pushed mower relating to the present invention is provided with a frame 2 holding an engine 1, a pair of wheels 3 disposed on a lower end 23b (on a rear position) of the frame 2, a handle 4 disposed on an upper end 23a (on a rear position) of the frame 2, and a mowing blade 5 disposed in front of the pair of wheels 3 and rotated by the engine 1. Two mowing blades 5, each of which is composed of a cord body of plastic, are attached to a rotation plate 49 as to protrude outward in diameter directions (refer to FIG. 11).

The frame 2 is provided with a center frame 6 of square pole of which upper end inclines backward, a plate 7 attached to a position front and middle of the center frame 6, a supporting rod 8 for handle attachment disposed on a front face of the upper end side of the center frame 6, and a frame body 9 in which a pipe body is bent U-shaped, of which both ends are fixed to a front face of the plate 7, and of which forth end inclines forward and being bent approximately J-shaped in a side view.

The pair of wheels 3 is attached to a lower end of the center frame 6 through an axle 10 so as to freely rotate, and the handle 4 is attached to an upper end of the supporting rod 8 protruding upward from the center frame 6 through an angle adjusting mechanism 11 (described later). The engine 1 is fixed to an attachment board 12 disposed on a forward inclined part of the frame body 9 with screws, etc. The configuration of the frame 2 is variously changeable and not restricted to the configuration shown in the drawing. The center frame 6, the frame body 9, and the supporting rod 8 may be formed by bending a pipe as described later in detail with another embodiment shown in FIG. 15 and FIG. 16.

Mark 13 represents a power transmitting mechanism to hold a rotation plate 49 to which the mowing blades 5 are attached in front of the wheels 3 as to rotate and transmit rotational force from the engine 1 to rotation plate 49. The power transmitting mechanism 13 is provided with a clutch case 14 attached to the front face side of the attachment board 12, a cylindrical holding rod 15 of which base end 15b is connected to the clutch case 14 and forth end 15a is protruding forward and downward, a gear case 16 disposed on the forth end 15a of the holding rod 15, an attachment plate 45 disposed on a lower end of the gear case 16, a driving shaft disposed inside the holding rod 15 connecting the engine 1 and a first gear in the gear case 16 as to freely rotate, and a rotation shaft connecting a second gear engaged with the first gear to the rotation plate 49.

Figure 4A:
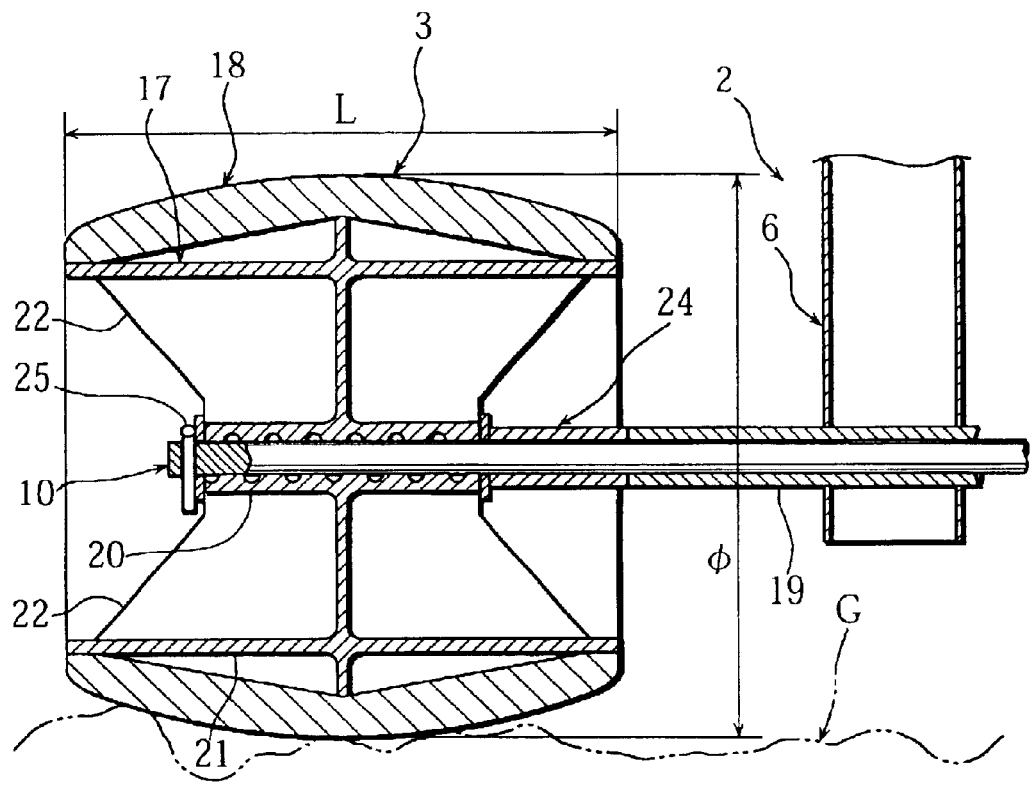
FIG. 4A is a cross-sectional view of a principal portion showing an attachment construction of a wheel to an axle when a width of a pair of wheels is changed.
Figure 4B:
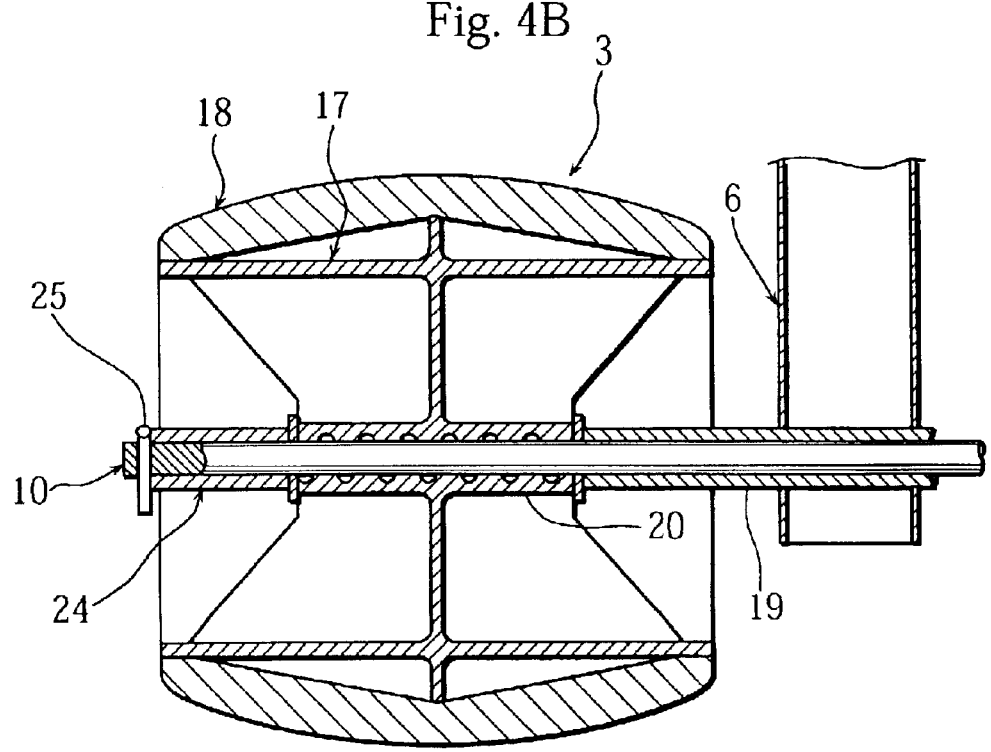
FIG. 4B is a cross-sectional view of a principal portion showing the attachment construction of the wheel to the axle when the width of the pair of wheels is changed.
Figure 5A:
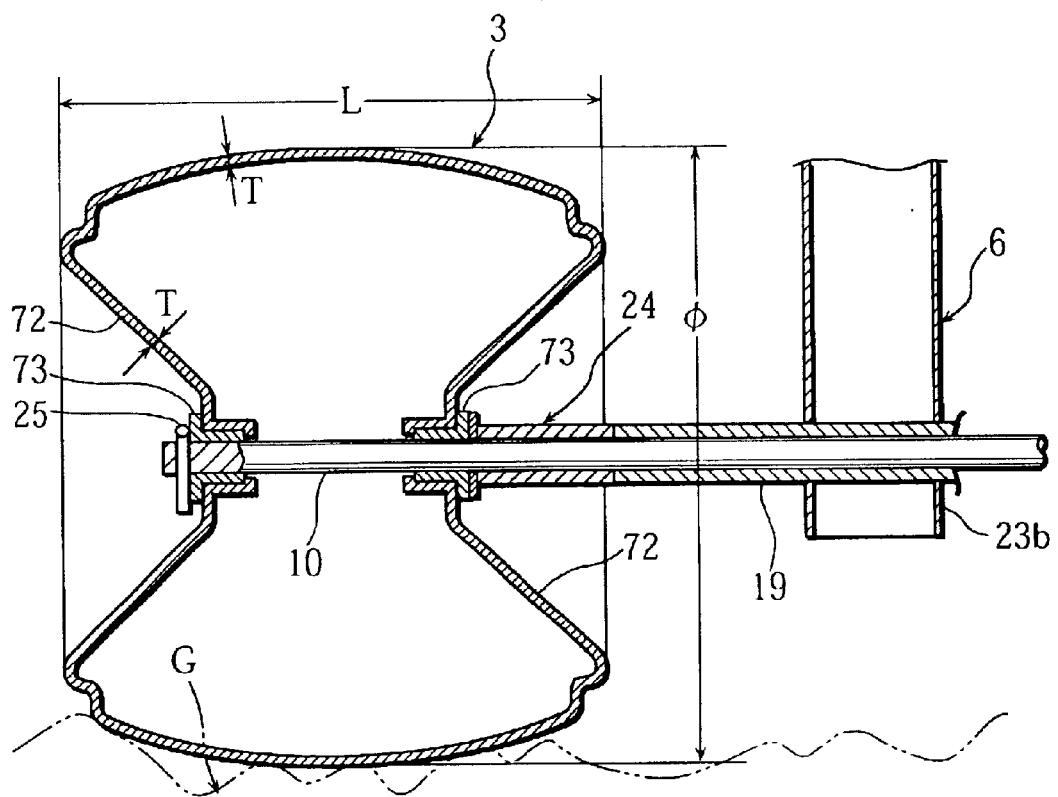
FIG. 5A is a cross-sectional view of a principal portion showing an attachment construction of a wheel to an axle when a width of a pair of wheels is changed.
Figure 5B:
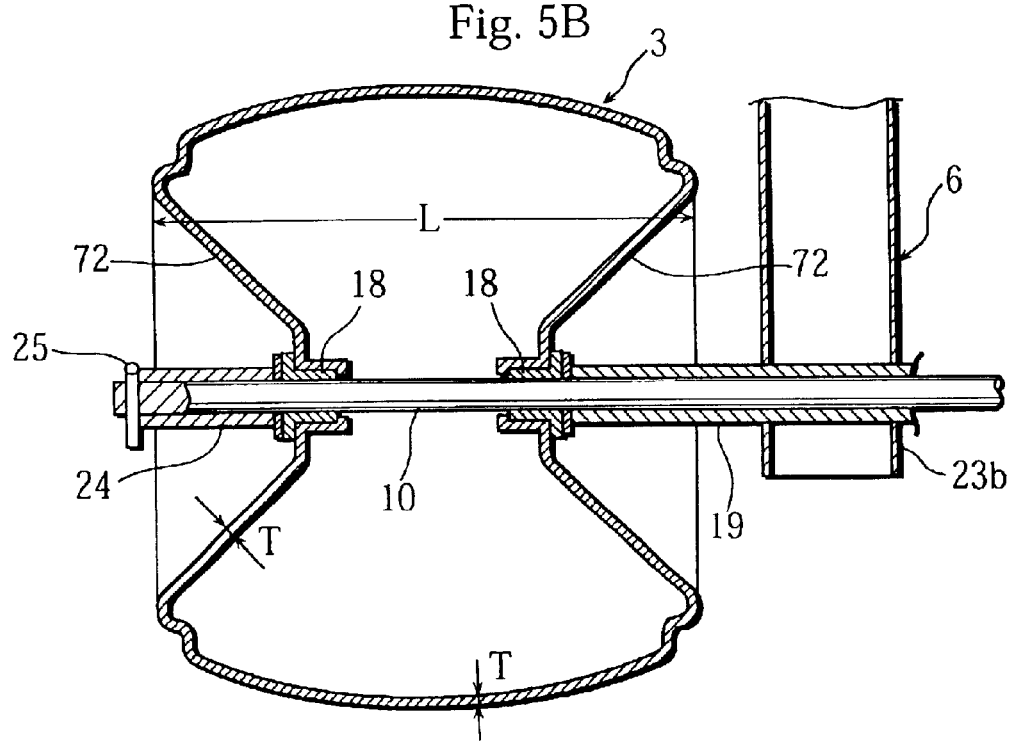
FIG. 5B is a cross-sectional view of a principal portion showing the attachment construction of the wheel to the axle when the width of the pair of wheels is changed.

As shown in FIG. 4 or FIG. 5, the wheel 3 is, for example, formed into a barrel shape of which width L is 150 to 250 mm, and diameter φ is 150 to 250 mm. To describe in detail, the wheel 3 in FIG. 4 has a wheel portion 17 and a tire 18 fitted to the wheel portion 17. The wheel portion 17 has a central boss portion 20, a peripheral wall portion 21, and plural ribs 22 in radius direction with regular intervals to connect the boss portion 20 to the peripheral wall portion 21. The tire 18 is fitted onto protruding outer edge of each of the ribs 22 in radius direction to form the barrel shape. And, the boss portion 20 retreats from side faces to the center in the direction of the axis of the wheel.

Figure 6:
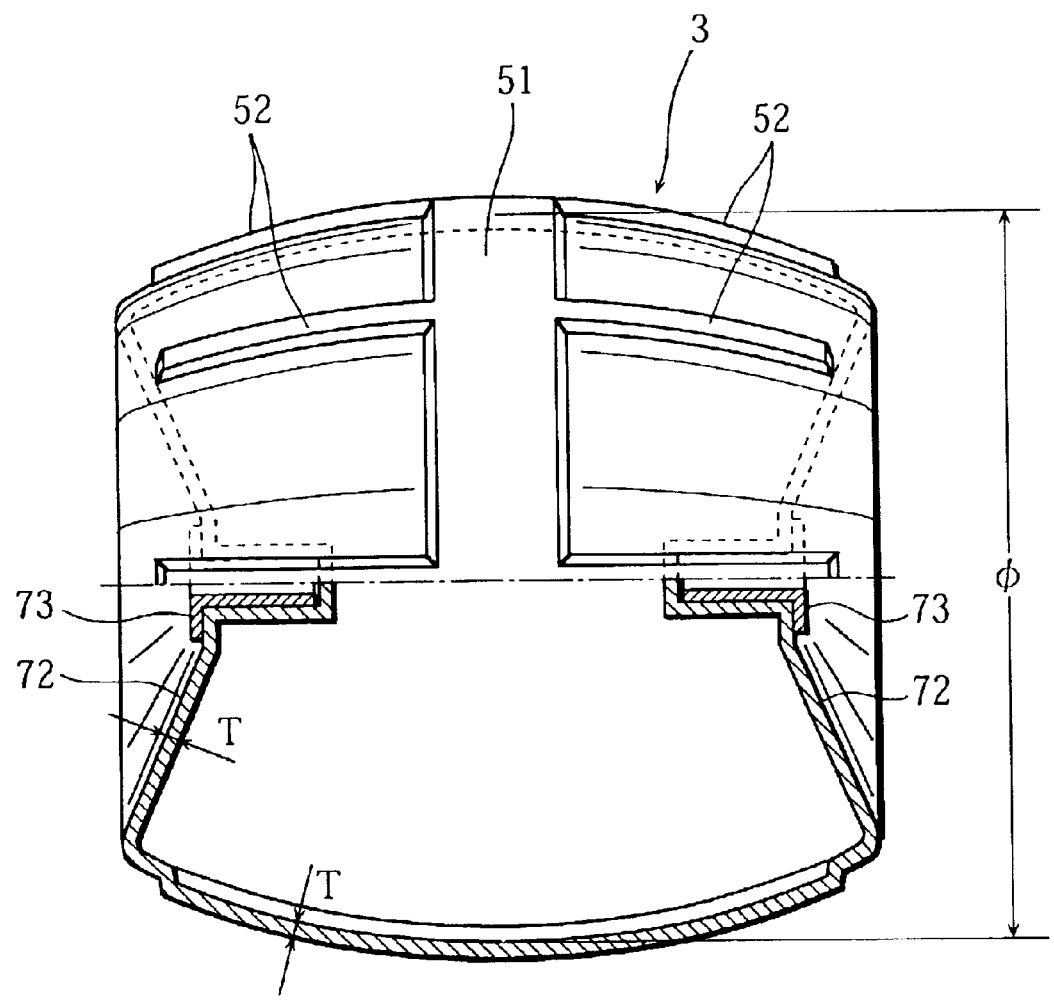
FIG. 6 is a half view of an example of the wheel.

FIG. 5 and FIG. 6 show another embodiment of the wheel 3. To describe in detail, the wheel 3, the wheel portion 17 and the tire 18 in FIG. 4 are omitted, is formed into a hollow barrel shape with synthetic resin such as polypropylene (PP) by blow molding. Further, left and right side plate portions 72, corresponding to lids of the barrel, are formed concave inwardly (conical concave), and a bearing 73 such as sliding bearing (bushing) is fitted to an axis portion of the side plate portion 72. An axle 10 is inserted to the two bearings 73 of the wheel 3 to hold the wheel like a double-held beam.

The wheel 3 is formed into a hollow barrel shape (a shell construction) by blow molding of synthetic resin, the thickness T is uniform, and an anti-skid concavo-convex pattern is formed with the uniform thickness T. Therefore, rigidity and strength of the whole wheel are sufficiently large, and the wheel can be light-weight and mass-produced with low cost. FIG. 6 illustrates how the concavo-convex pattern on the wheel 3 is formed with the circular central convex raised portion 51 and plural convex portions 52 extending from the convex raised portion 51 in the axis direction in both sides parallel to each other.

The barrel-shaped wheel 3 having large width L, as shown in FIG. 4A and FIG. 5A, does not get into a convex on ground G having many concave and convex portions and gravel, and the mower is moved smoothly by small pushing force without inclination (staggering).

Figure 7A:
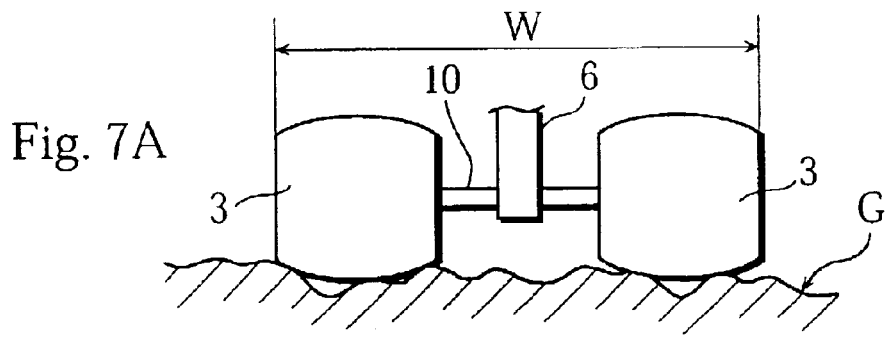
FIG. 7A is an explanatory view of working effect when the width of the pair of wheels is large.
Figure 7B:
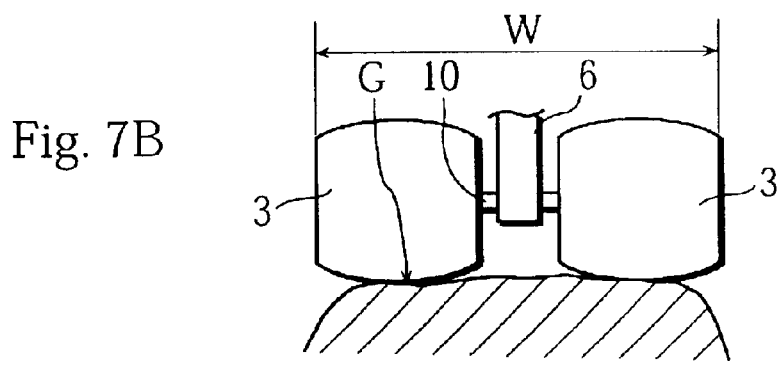
FIG. 7B is an explanatory view of working effect when the width of the pair of wheels is small.

Further, as shown in FIGS. 7A and 7B, the pair of wheels 3 are attached to the axle 10 as the width W is adjustable. To describe attachment construction of the wheel 3 to the axle 10 concretely, as shown in FIGS. 4A and 5A, a pipe body 19 (shorter than the axle 10) is disposed horizontally on a lower end of the center frame 6 of the frame 2, and the axle 10 is inserted to the pipe body 19 as both ends of the axle protrude from the pipe body. And, the boss portion 20 of the wheel portion 17 (the bearing 73 of the wheel 3) is fitted to the end of the axle 10 to attach the wheel 3. A cylindrical spacer 24 is fitted between the wheel 3 and the pipe body 19 on the axle 10, and a stopper 25 (a split pin, for example) is attached to the end portion of the axle 10 to set the width W of the pair of wheels 3 for stable movement of the mower even on the rough ground G with many concave and convex portions. In this case, stability is made excellent by synergistic effect of the barrel shape of the wheels 3.

To decrease the width W as shown in FIG. 7B to run on a narrow ground (a path) G, the stopper 25 in the state shown in FIGS. 4A and 5A is pulled out, the wheel 3 and the spacer 24 are pulled out of the axle 10, then, the wheel 3 is attached to the axle 10, and the spacer 24 is attached to the end portion of the axle 10 and stopped with the stopper 25. Also in the case of FIG. 5, the axle 10 is held by the two bearings 73 like a center beam to the wheels 3. With this construction, beneficial to the strength of the axle 10, the wheels 3 keep stable position to rotate.

Figure 8:
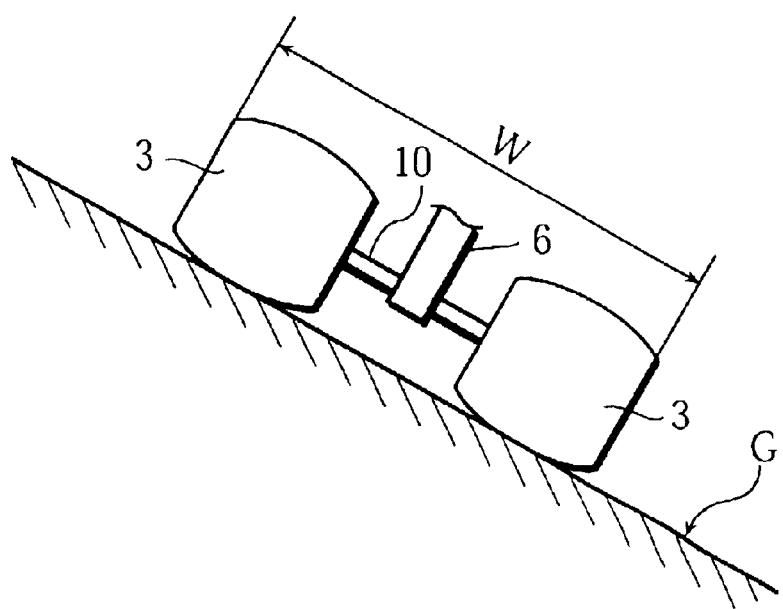
FIG. 8 is an explanatory view showing contact state of the wheel on an inclined ground.

And, as shown in FIG. 8, with large width W, the mower is operated and moved stably, and not upset, in working on an inclined ground (slope) G.

Figure 3:
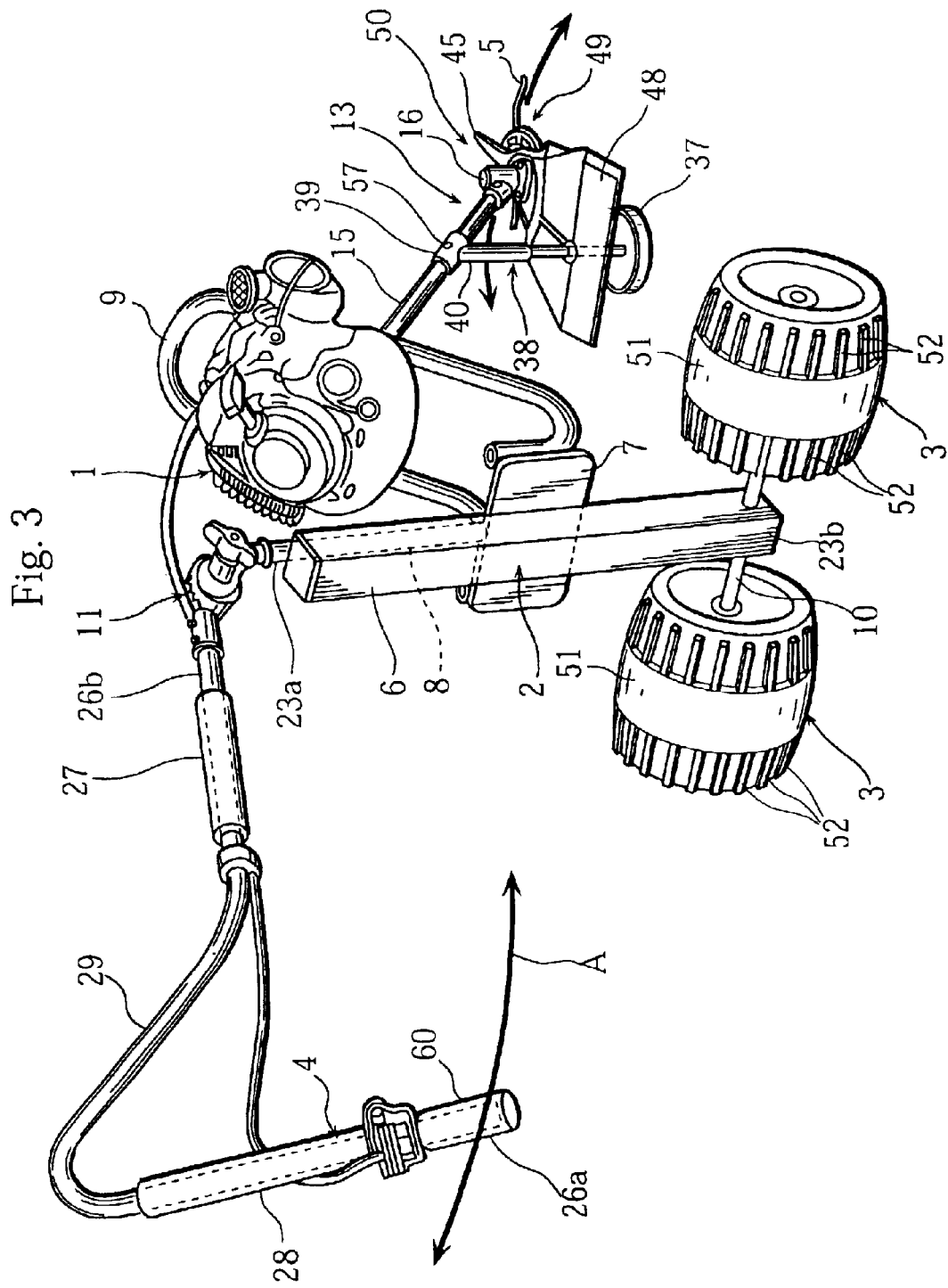
FIG. 3 is a perspective view of a hand-pushed mower observed obliquely from behind.

As shown in FIGS. 1, 2, and 3, the handle 4 has a portion 27 in back-and forth direction on a base end 26b side, a portion 28 in up-and-down direction of which forth end 26a is in up-and-down direction, and a middle curved portion 29. And, the base end 26b (the end portion of the portion 27) of the handle 4 is attached to the upper end 23a of the frame 2 through the angle adjusting mechanism 11.

Figure 9:
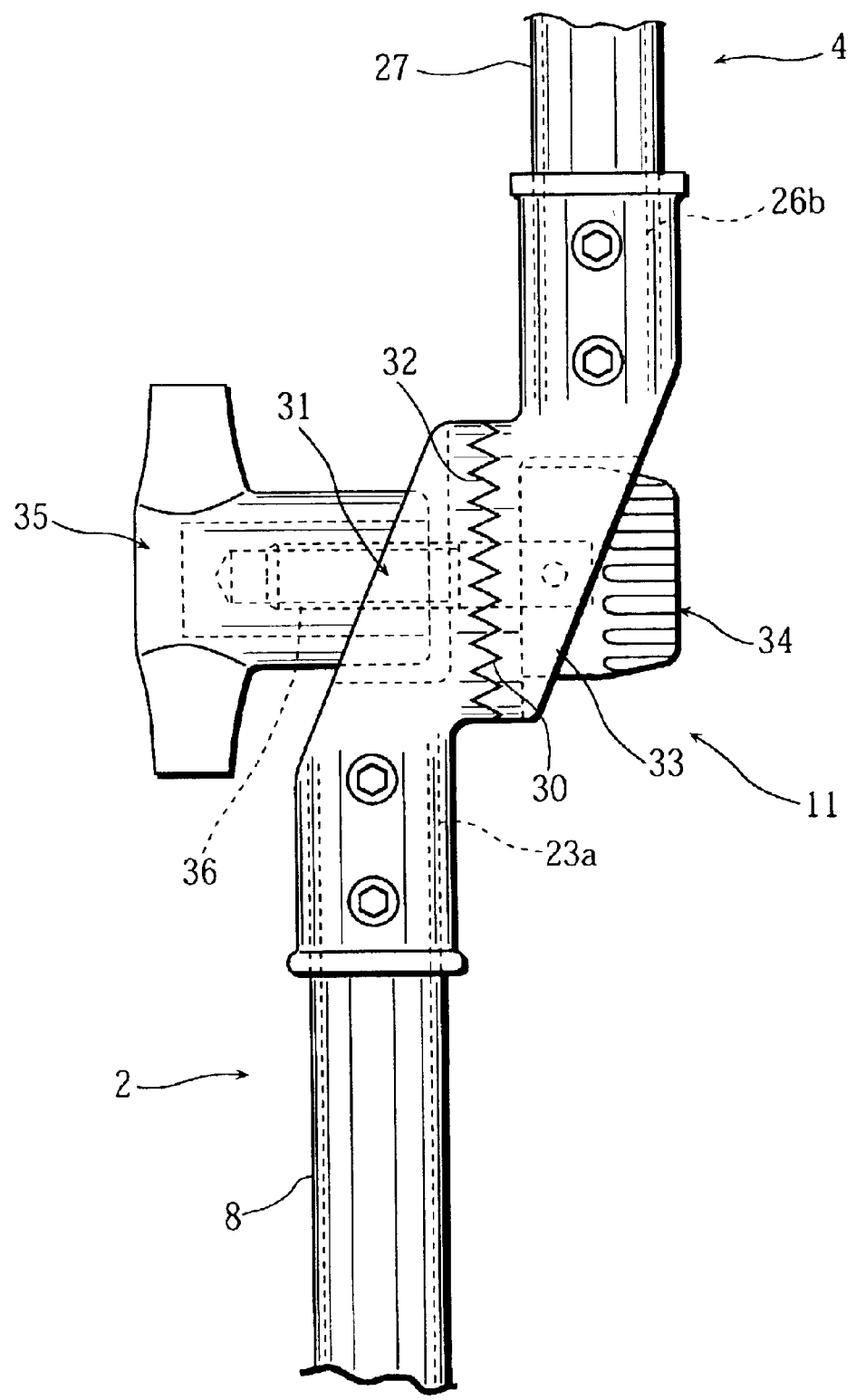
FIG. 9 is a plane view of a principal portion showing an angle adjusting mechanism.
Figure 10:
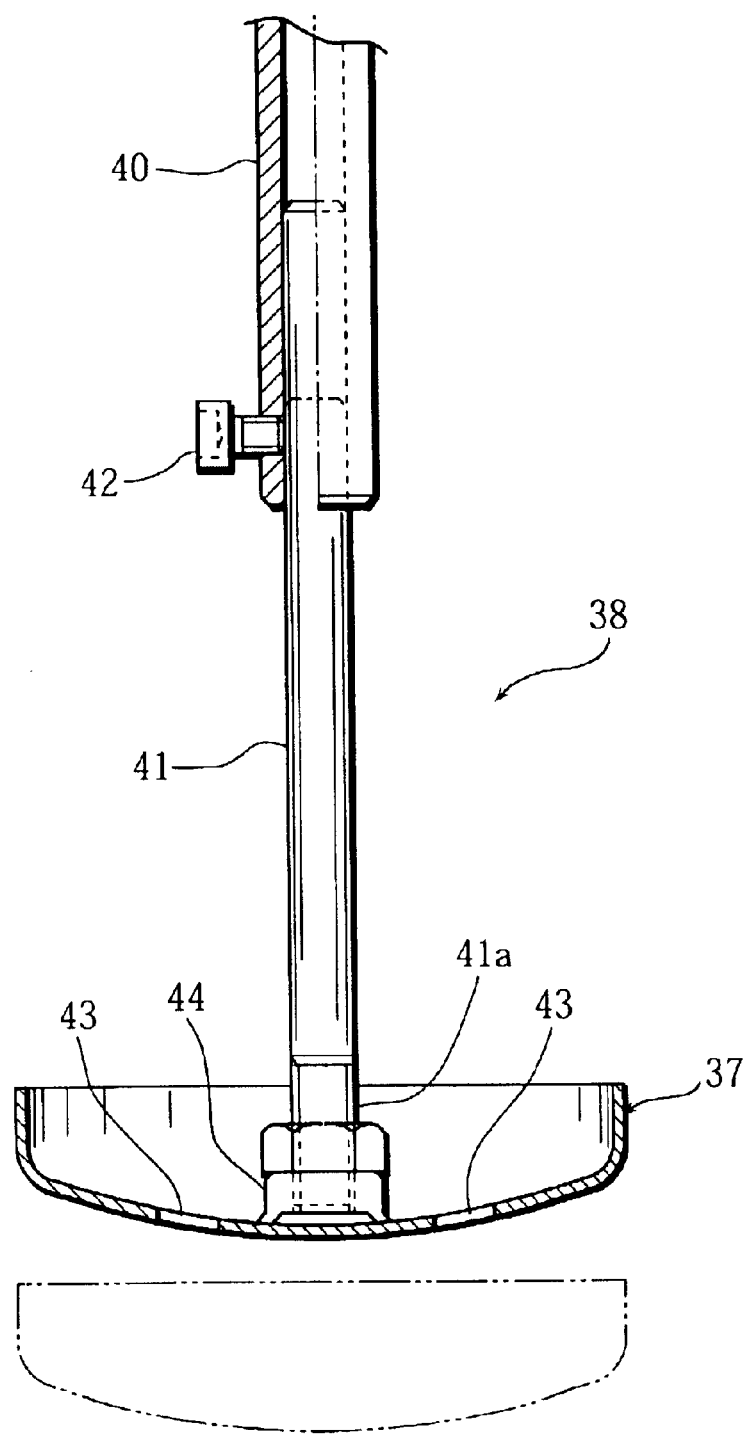
FIG. 10 is a cross-sectional view of a principal portion showing a blade height adjuster.

As shown in FIG. 9, the angle adjusting mechanism 11 is provided with a first member 31 having circular first engaged teeth 30 directed toward right side and fixed to the upper end 23a of the frame 2, a second member 33 having circular second engaged teeth 32 engaged with the first engaged teeth 30 and fixed to the base end 26b of the handle 4, and a bolt portion 34 and a nut portion 35 to connect the first and second members 31 and 33 with the first and second engaged teeth 30 and 32 engaged each other. A mark 36 represents a male screw of the bolt 34 inserted to hole portions of the first and second engaged teeth 30 and 32.

As described above, the angle adjusting mechanism 11 is disposed on the connected portion of the base end 26b of the handle 4 and the upper end 23a of the frame 2, the handle 4 is released and the portion 27 in back-and forth direction on the base end 26b side can swing up and down as shown with imaginary lines in FIG. 1 by loosening the nut portion 35 of the angle adjusting mechanism 11 to part the second member 33 from the first member 31 and release the engagement between the first and second engaged teeth 30 and 32, and the handle 4 is fixed by fastening the nut portion 35 at a desired inclination angle. That is to say, the portion 28 in up-and-down direction on the forth end 26a side can be adjusted to a desirable height by adjusting the inclination angle of the portion 27 in back-and forth direction.

Therefore, the mower corresponds to the height of workers, and mowing under low trees as in an orchard is easily conducted. And, as shown in FIG. 2 and FIG. 3, the forth end 26a, acting as a grip of the handle 4, is vertical, and the handle 4 can be easily swung left and right (as shown with an arrow A) with one hand, and mowing a wide track, with the rotation plate 49 and the blades 5 swung left and right, is easy. Further, the handle 4 serves as a leg for raising the blades 5 when the forth end 26a is placed on the ground G.

As clearly shown in Figures, the handle 4 is disposed as to protrude backward from the frame 2 (through the angle adjusting mechanism 11), and the power transmitting mechanism 13 is disposed as to protrude forward from the frame 2. That is to say, a grip portion 60 on the forth end 26a of the handle 4 is positioned sufficiently behind the frame 2, and the mowing blade 5 on the forth end of the holding rod 15 is positioned sufficiently before the the frame 2.

In other words, in the hand-pushed mower provided with the frame 2 to which the engine 1 is attached, (the pair of) wheels 3, the handle 4 having the grip portion 60 which a walking worker grips with hand, and the mowing blade 5 rotated by the engine 1, wherein the wheels 3 are disposed on a middle position in longitudinal direction between the mowing blade 5 on the front position and the grip portion 60 on the rear position, the worker grips the grip portion 60 of the handle 4 with hand and pushes the mower to move while the weight of the mower is supported as in a balance on the contact point of the wheel 3 with the ground as a supporting point.

That is to say, as in a balance, the center of gravity of the whole (weight) is made corresponding to or situated near the contact point of the wheel 3 with the ground, namely, a position right below the axle 10. For example, it is preferable to dispose heavy members such as the engine 1 (and a battery not shown in Figures) as near as possible to the approximately middle position which is the position near the contact point of the wheel 3 with the ground, extend the holding rod 15 forward, and extend greatly the handle 4 backward.

And, in the mower of the present invention, as shown in FIGS. 1, 2, 3, and 10, an expandable and contractable blade height adjuster 38, having a sliding plate 37 sliding on the ground G, is attached to the holding rod 15 (of the power transmitting mechanism 13) to adjust blade height H. To describe in detail, the blade height adjuster 38 is provided with a short cylinder portion 39 fitted to the holding rod 15, an outer cylinder portion 40 protruding downward and continuing from the short cylinder portion 39, a shaft portion 41 inserted to a lower opening of the outer cylinder portion 40 as to slide, and the bowl-shaped sliding plate 37 united with a nut portion 44 screwed to a male screw 41 on a lower end of the shaft portion 41. And, in the blade height adjuster 38, a fastening screw 42 is screwed to a tapped hole on the lower end of the outer cylinder portion 40 to fix the shaft portion 41 to the outer cylinder portion 40, and a fastening screw 57 is screwed to a tapped hole on the short cylinder portion 39 to fix the blade height adjuster 38 to the holding rod 15 (refer to FIG. 11). And, the sliding face (lower face) of the sliding plate 37 on the ground, G is formed as to curve upward from the center to the periphery to prevent the plate from stacking on concave and convex portions on the ground G. A mark 43 represents an escape hole of the sliding plate 37.

With the blade height adjuster 38, height H of the rotation plate 49 having the mowing blades 5 from the ground G can be adjusted by adjustment of protruding amount of the shaft portion 41 from the outer cylinder portion 40 with the fastening screw 42. That is to say, the rotation plate 49 can be held at the desired height H in a three-point support on the right and left wheels 3 and the sliding plate 37, and grass is cut with uniform height as in flat mowing of lawn.

Figure 11:
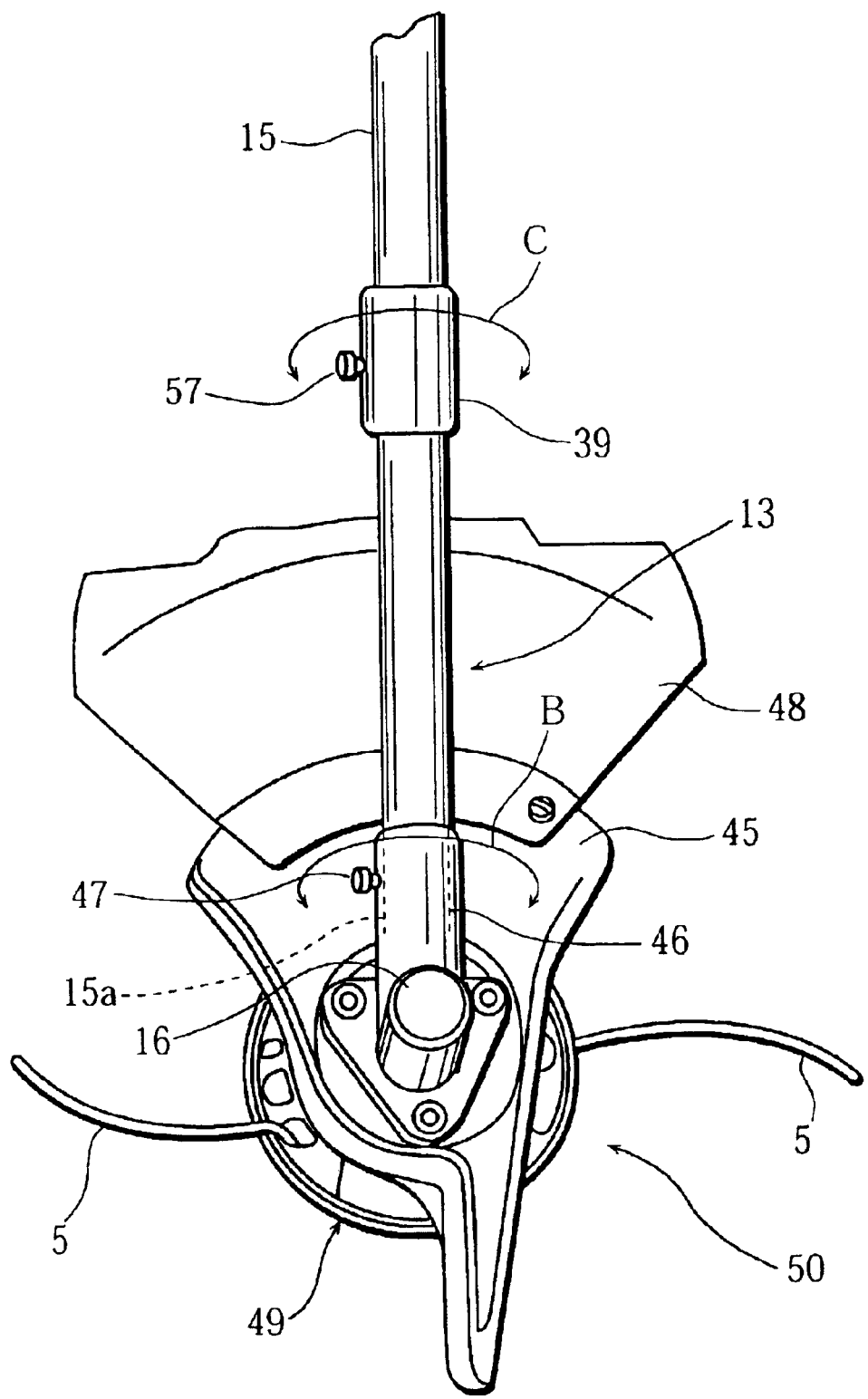
FIG. 11 is a plane view of a principal portion showing an attached state of a rotation plate to a holding rod as to be oscillatable.
Figure 12:
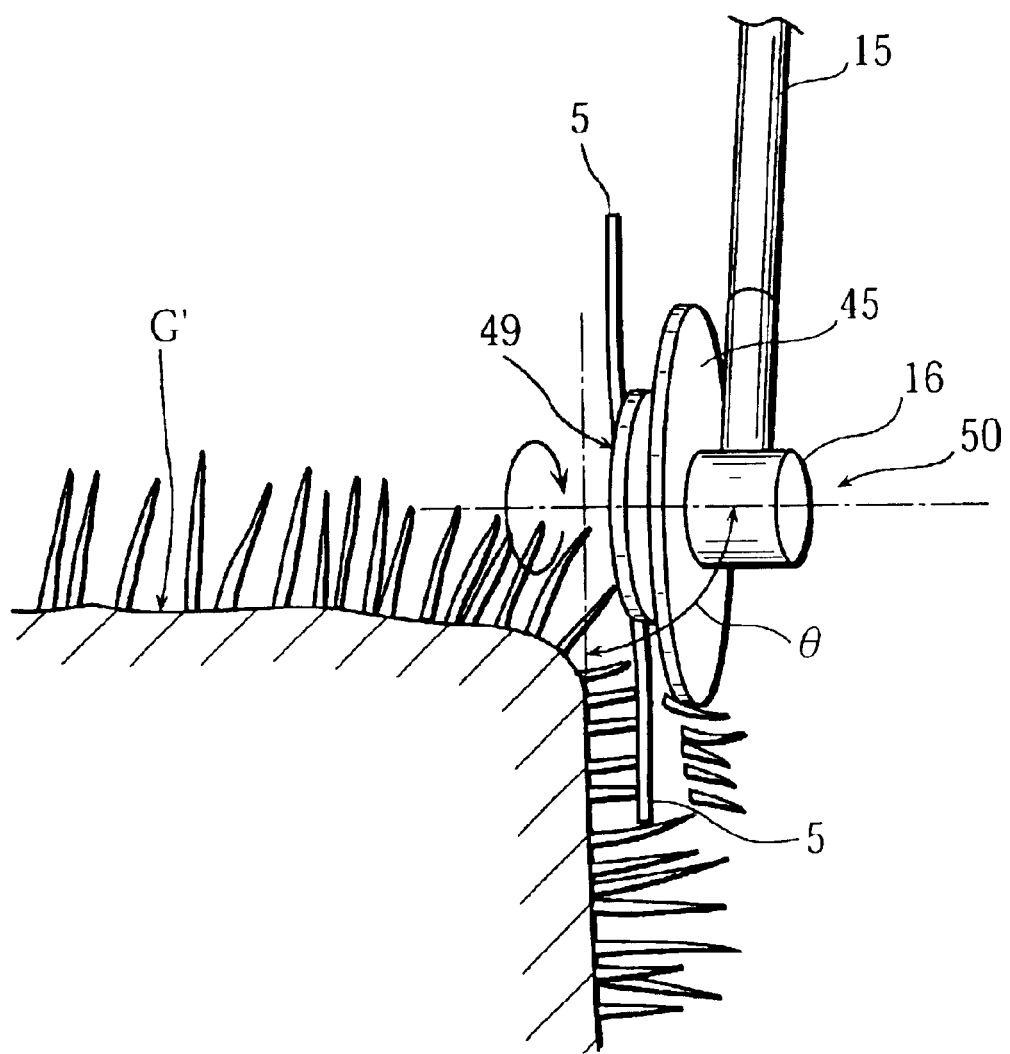
FIG. 12 is an explanatory view showing trimming state with a mowing blade angle of 90°.

And, as shown in FIG. 11 and FIG. 12, in the mower, the blades are attached to the forth end 15a of the holding rod 15 as to oscillate around the holding rod 15 to make blade angle θ adjustable. That is to say, in the power transmitting mechanism 13, a short cylinder portion 46 united with the gear case 16 is attached to the forth end 15a of the holding rod 15, and a fastening screw 47 is screwed to a tapped hole on the short cylinder portion 46 to fix the short cylinder portion 46 to the holding rod 15. Therefore, the unit body 50, provided with the short cylinder portion 46, the gear case 16, the attachment plate 45 and the mowing blades 5, can be oscillated around the holding rod 15 (as shown with an arrow B) when the fastening screw 47 is loosened, and the desired blade angle θ is fixed by fastening the fastening screw 47. As shown in FIGS. 1 through 3 and 11, when a grass dispersion prevention plate 48 is attached to a rear end of the attachment plate 45, and the shaft portion 41 of the blade height adjuster 38 penetrates the grass dispersion prevention plate 48, the fastening screw 57 of the blade height adjuster 38 is also loosened to rotate (as shown with an arrow C) in the same direction with the unit body 50.

As described above, with the adjustable blade angle θ, trimming on side faces of the ground (surface) G such as a path between fields and a bank, as shown in FIG. 12, is easily conducted by adjusting the blade angle θ, for example, to be approximately 90°.

Figure 13:
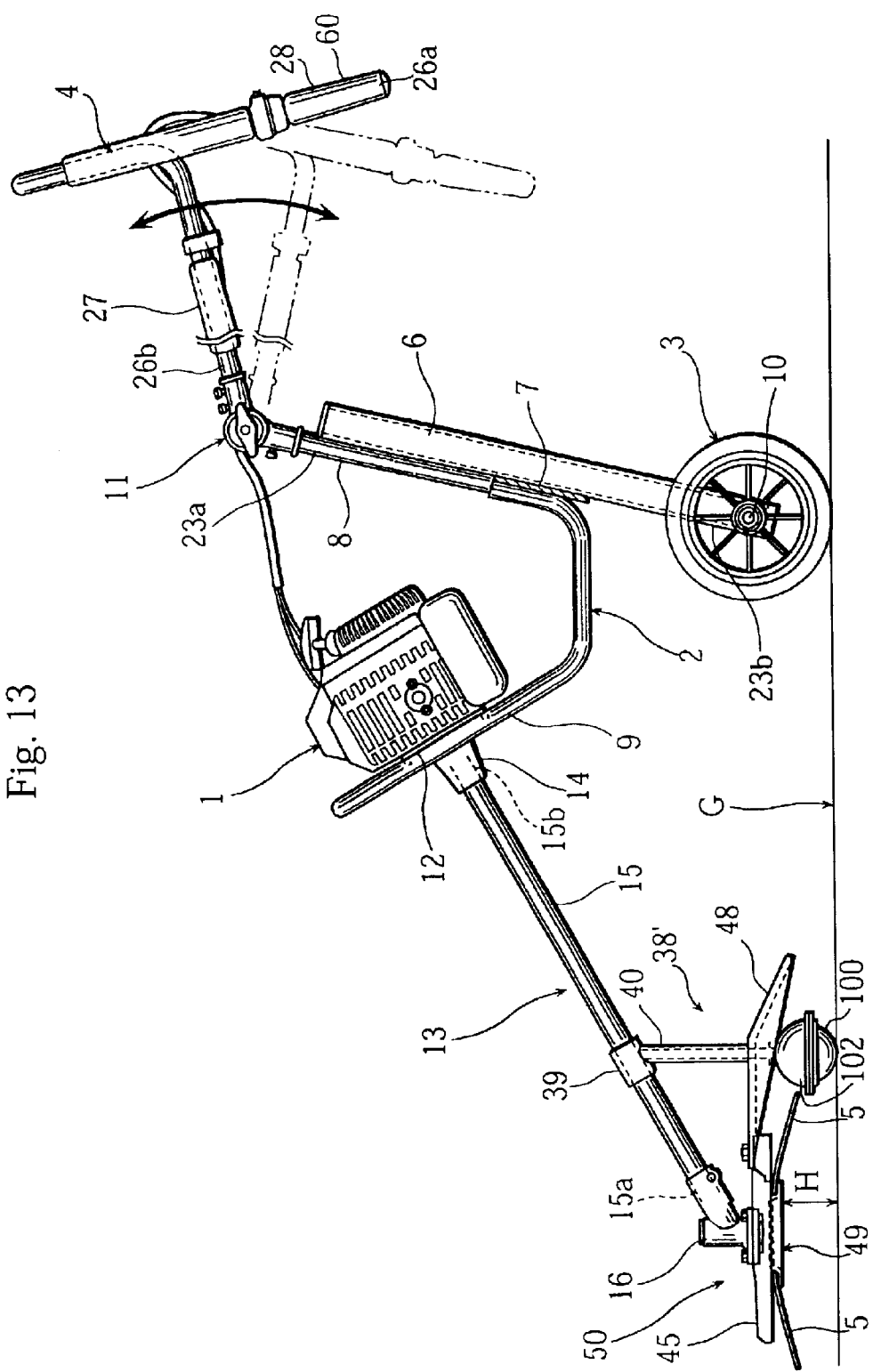
FIG. 13 is a side view showing a second embodiment of the present invention.
Figure 14:
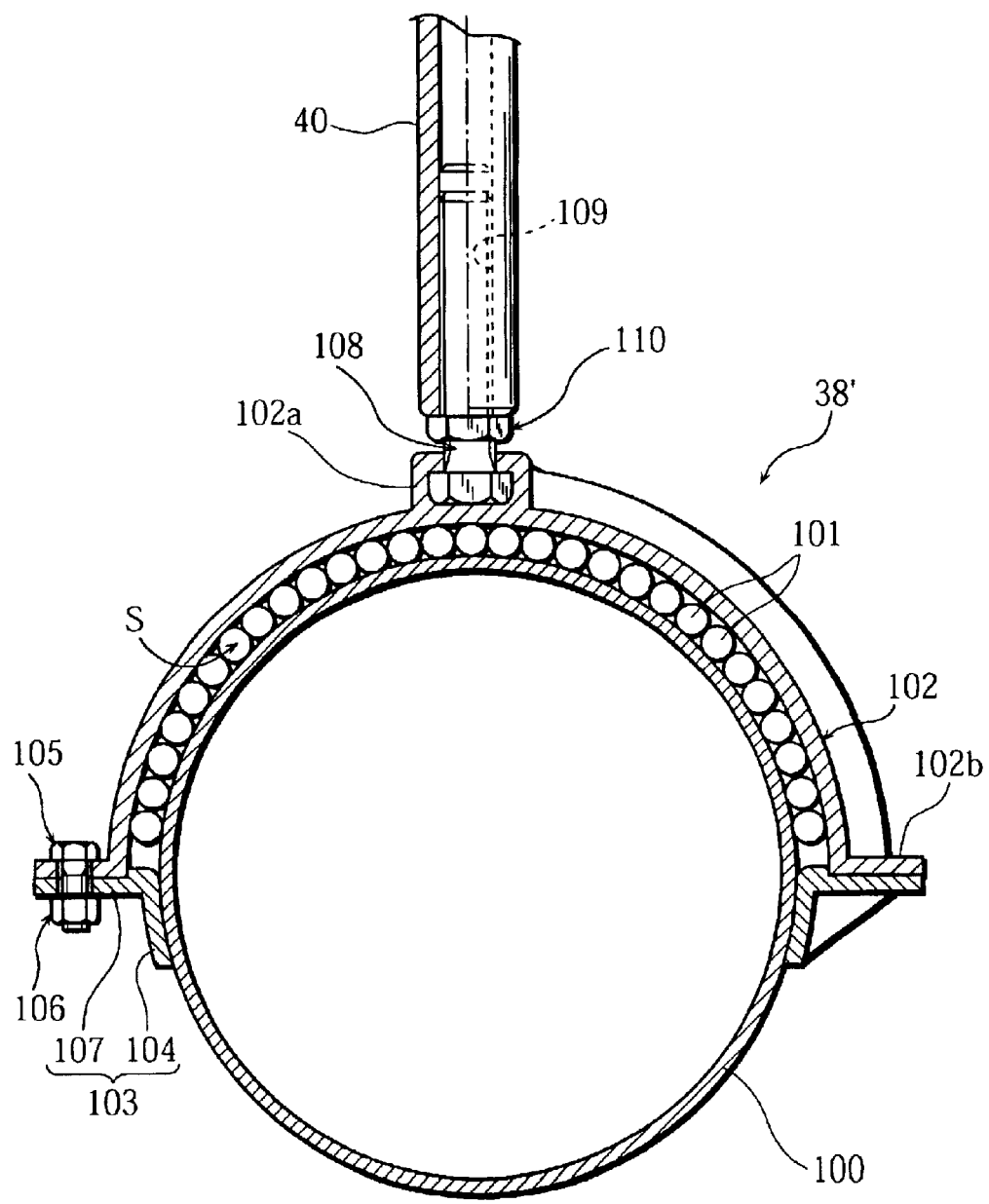
FIG. 14 is a cross-sectional view of a principal portion showing a blade height adjuster.

FIG. 13 and FIG. 14 show a second embodiment. This hand-pushed mower has a blade height adjuster 38' (having a different construction) attached to the holding rod 15. The height H of the blade is adjusted by the blade height adjuster 38'.

The blade height adjuster 38', having a sphere 100 rolling on the ground G, is provided with many small spheres 101 holding the sphere 100, and a semi-spherical shell-like receiving member 102 forming a gap S with a spherical upper face of the sphere 100 to hold the many small spheres 101 in the gap S. The sphere 100 is, for example, composed of hollow shell-like plastic. And, the semi-spherical shell-like receiving member 102 has a horizontal brim portion 102b on a lower end.

A mark 103 represents a stopping ring to hold the sphere 100 in a predetermined position and prevent the small spheres 101 from falling out of the gap S. The stopping ring 103 is composed of a stopping portion 104 diminishing downward in diameter, and a horizontal brim portion 107 continuing from an upper end of the stopping portion 104 and fixed to the horizontal brim portion 102b of the receiving member 102 with a bolt 105 and a nut 106.

The receiving member 102 is formed unitedly with a screw member 108, and the receiving member 102 and a lower end of the screw member 108 are connected on a top portion 102a of the receiving member 102. The screw member 108 is screwed to a tapped hole 109 formed on an inner face of the outer cylinder portion 40. The screw member 108 is prevented from loosening on the lower end portion of the outer cylinder portion 40 by a lock nut 110. And, it is preferable to use plastic, except the outer cylinder portion 40, the screw member 108, the bolt 105, and the nut 106, as the material of the blade height adjuster 38' for rust prevention, light weight, and reducing frictional resistance.

According to the mower of the present invention constructed as described above, running ability and stability on the ground G having many concaves and convexes and on the slope are improved, and the mower can run on a narrow path like a path between fields because the wheel 3 is formed with blow molding into a hollow barrel shape and the width D of the wheels is adjustable. And, the mower is easily operated irrespective of the height of the worker because the forth end 26a side of the handle 4 is vertical and height-adjustable. And, flat mowing is easily conducted because the blade height H is adjustable with the blade height adjuster 38 or 38'. The worker does not have to balance with the handle 4 to raise the blade 5 on the ground G because of the three-point supporting with the (right and left) wheels 3 and the blade height adjuster (38 or 38'). And, mowing on the side face is easily conducted because the blade angle θ is adjustable. Therefore, although only grown-up skilled workers can handle conventional mowers because operation and mowing are difficult and dangerous, unskilled women and children can operate the mower of the present invention safely and easily to conduct mowing.

Figure 15:
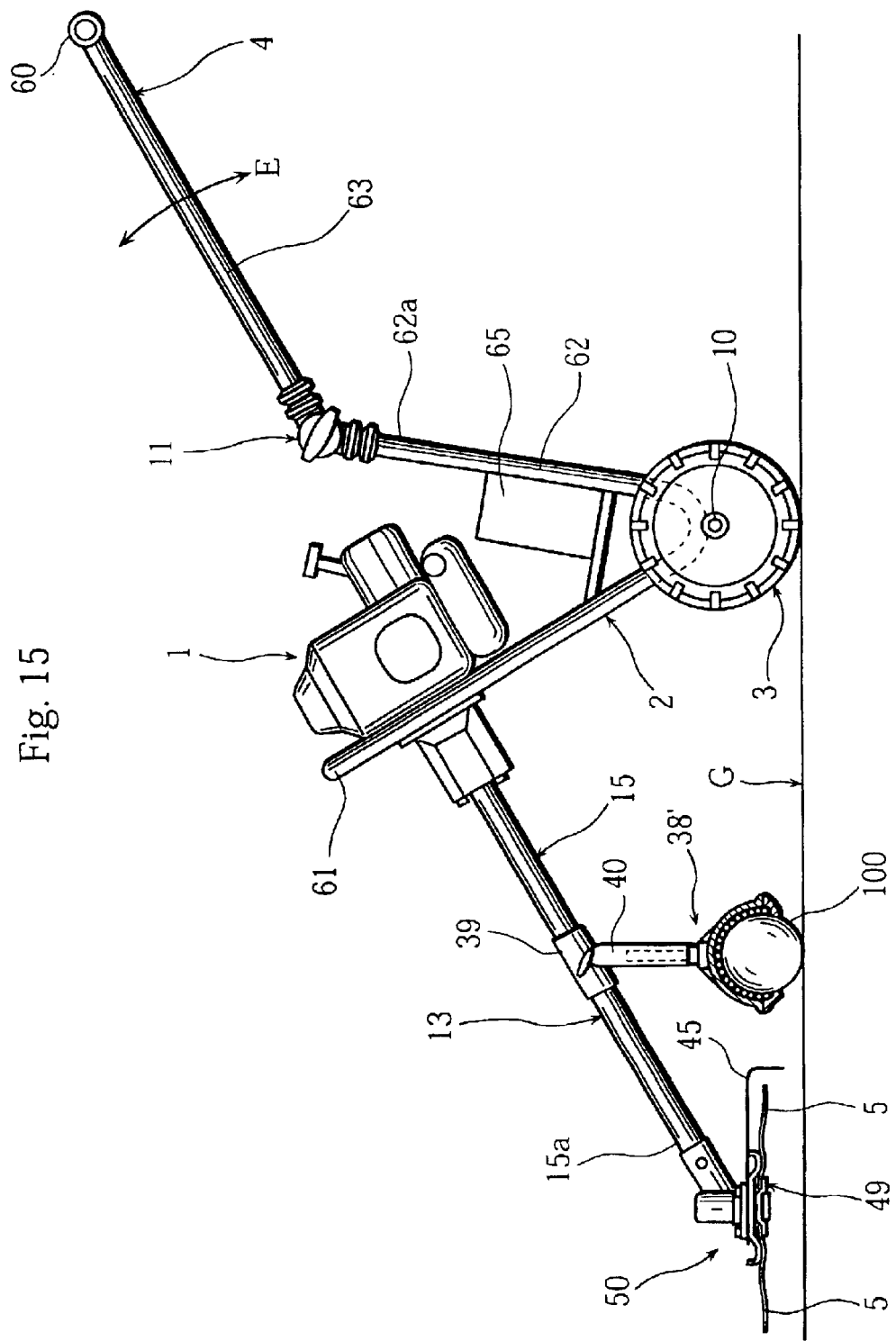
FIG. 15 is a side view showing a third embodiment of the present invention.
Figure 16:
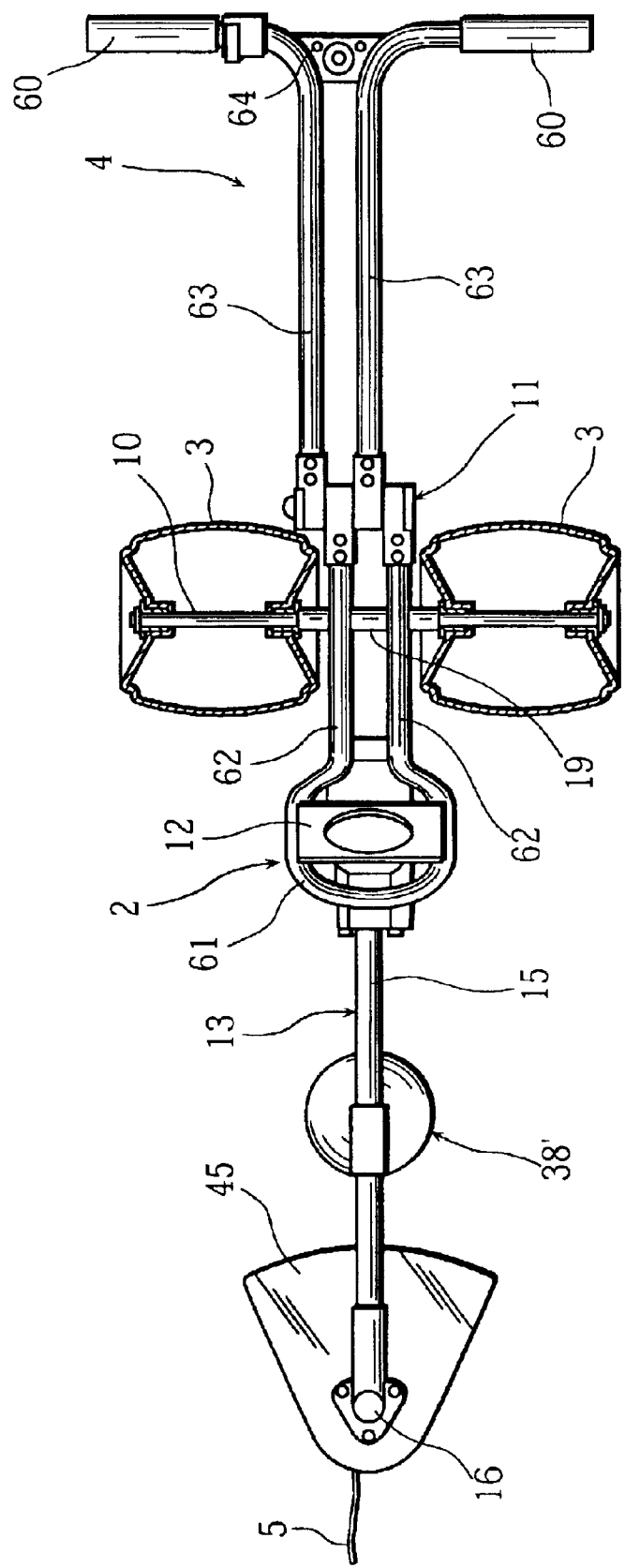
FIG. 16 is a plane view with partial omission.

Next, a side view of FIG. 15 and a top view of FIG. 16 show a third embodiment of the present invention.

In FIG. 15 and FIG. 16, different points from the above-described first and second embodiments are as follows.

The frame 2 is composed (mainly) of a pipe artfully bent and formed into the center frame 6, the frame body 9, and the supporting rod 8 for simplified and light-weight construction, and for easy production. That is to say, one pipe is bent and formed into a V-shape in a side view. And, in a plane view, the frame has a circular frame portion 61 (to which the attachment board 12 of the engine 1 is fixed) approximately a loop having a rear opening, and two parallel supporting rods 62 are continuing from the circular frame portion 61 as to extend backward.

The two supporting rods 62 form the V-shape in side view, and the axle 10 is attached to lower ends (bottom) of the two supporting rods 62.

That is to say, right and left wheels 3 are attached to the lower end portion of the V-shaped frame 2 made of one pipe through the axle 10 as to freely rotate. And, the handle 4 is attached to a rear upper end portion 62a of the V-shaped frame 2 through the (above-described) angle adjusting mechanism 11 as to oscillate only in up-and-down direction (refer to an arrow E) to adjust the attachment angle.

The configuration of the handle 4, different from that of the first and second embodiments, is that two pipes 63 approximately L-shaped in plane view are disposed line-symmetric, rear ends of the pipes 63 are connected and united with a connecting member 64, and front ends are connected by the angle adjusting mechanism 11. Therefore, grip portions 60 are directed horizontal, and the whole handle 4 may be approximately T-shaped.

In FIG. 16, the engine 1 is omitted. It is preferable to dispose heavy components such as a battery 65 within the V of the frame 2 approximately centered in the mower to keep the balance.

A blade height adjuster 38', similar to the blade height adjuster 38' in FIG. 13, is attached to a middle portion of the supporting rod 15, and the grass dispersion prevention plate 48 shown in FIG. 13 is omitted.

Instead of the prevention plate 48, the attachment plate 45 is extended backward as an arc in plane view to prevent the mowed grass from being dispersed on the worker behind the mower.

The third embodiment has a construction common to the first and second embodiments in which the hand-pushed mower is provided with the frame 2 to which the engine 1 is attached, the pair of wheels 3, the handle 4 having the grip portion 60 which a walking worker grips with hand, and the mowing blade 5 rotated by the engine 1, and, the wheels 3 are disposed on a middle position in longitudinal direction between the mowing blade 5 on the front position and the grip portion 60 on the rear position, the worker grips the grip portion 60 of the handle 4 with hand and pushes the mower to move while the weight of the mower is supported as in a balance on the contact point of the wheel 3 with the ground as a supporting point. Description of the rest of the members is omitted because they are similarly constructed as in the first and second embodiments.

Figure 17:
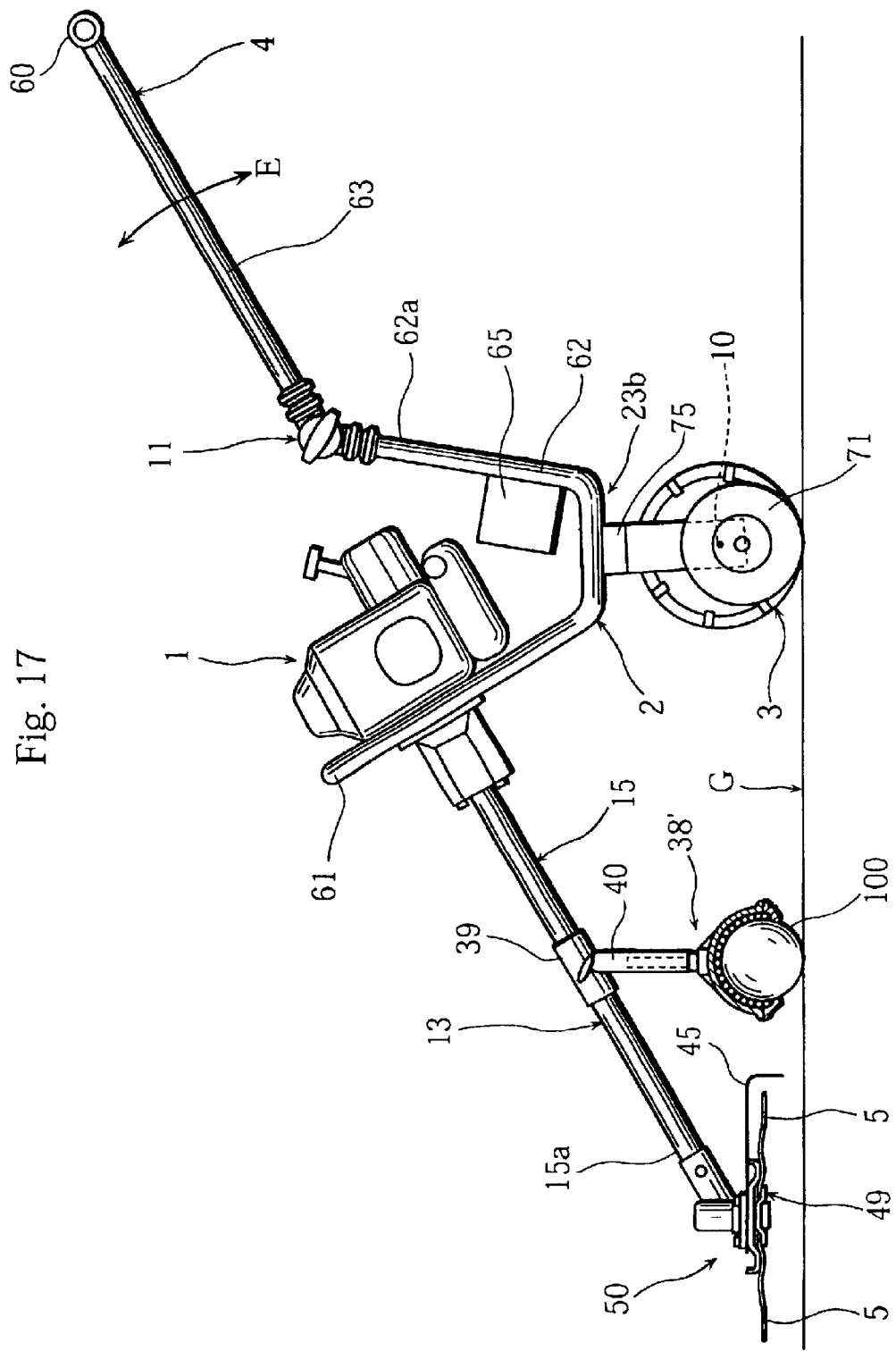
FIG. 17 is a side view showing a fourth embodiment of the present invention.
Figure 18:
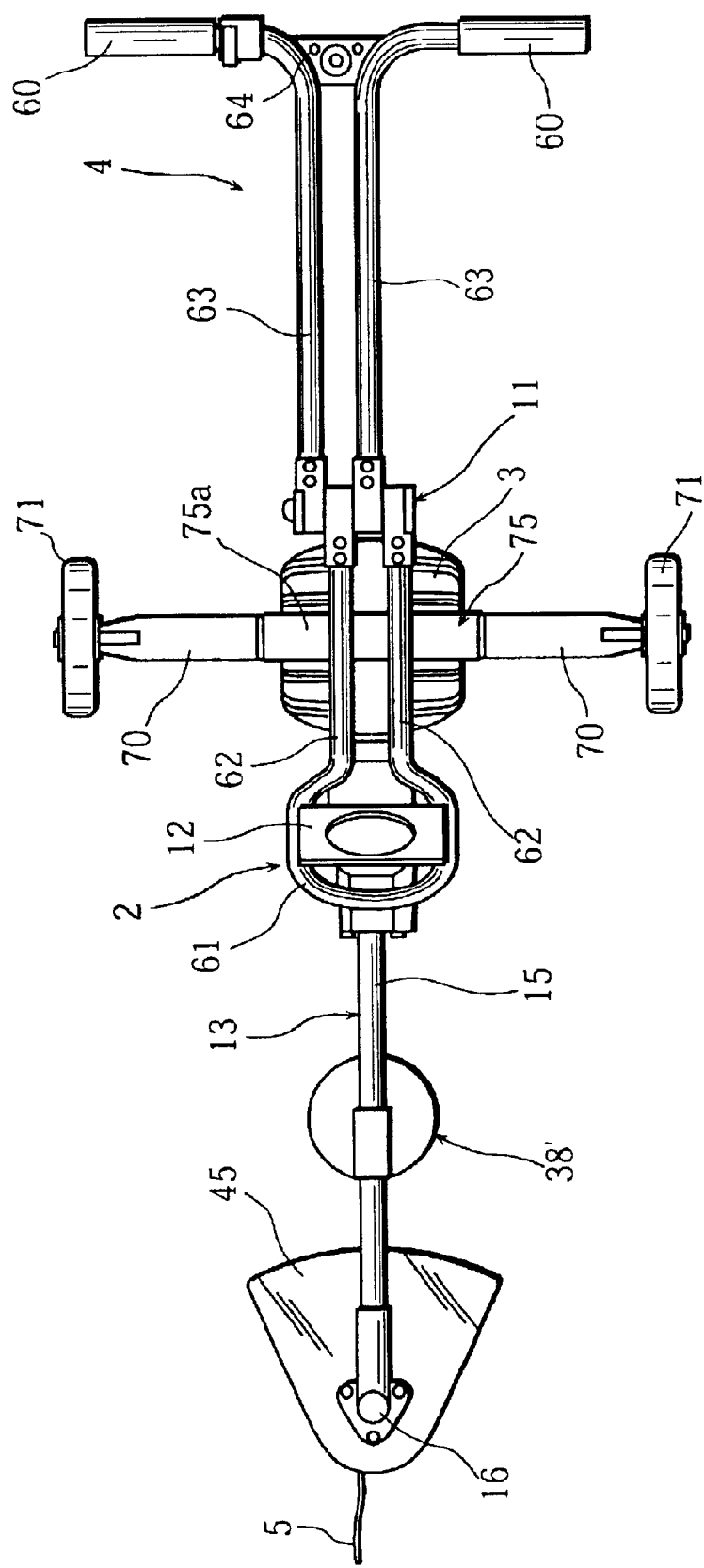
FIG. 18 is a plane view with partial omission.

Next, a side view of FIG. 17 and a plane view of FIG. 18 show a fourth embodiment of the present invention.

Figure 19:
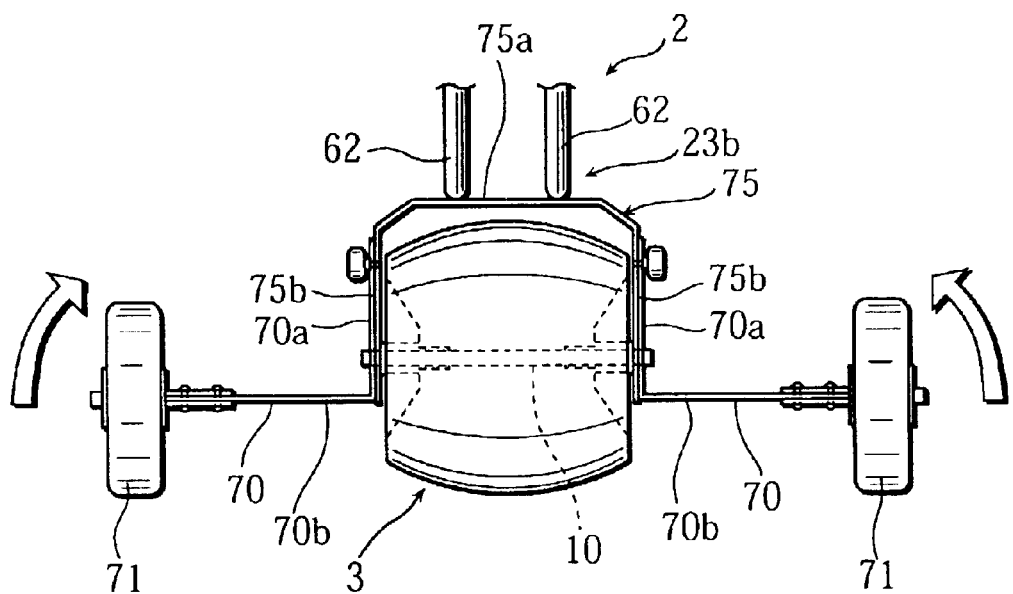
FIG. 19 is a front view of a wheel portion.
Figure 20:
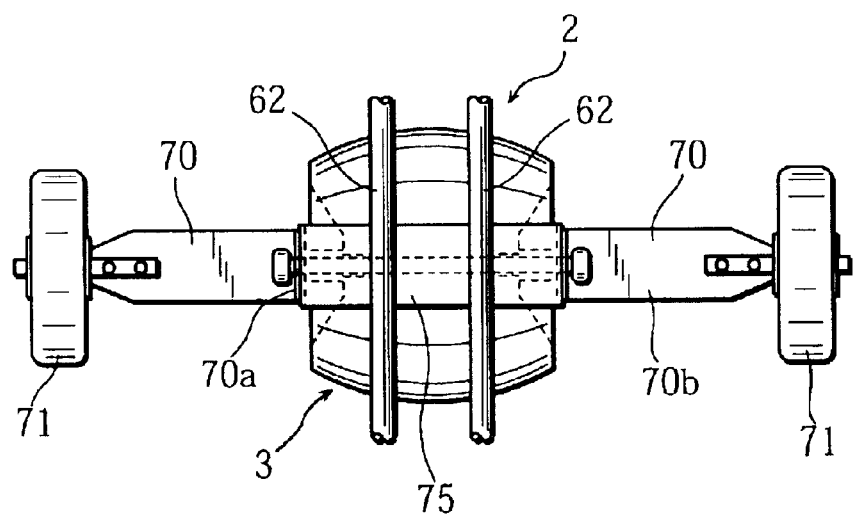
FIG. 20 is a plane view of the wheel portion.

In FIG. 17 and FIG. 18, different points from the above-described third embodiment are as follows. FIG. 19 and FIG. 20 show a front view and a plane view of a wheel portion.

One barrel-shaped wheel 3 is attached to the lower end 23b of the frame 2 through a U-shaped bracket 75. That is to say, a back portion 75a of the bracket 75 is fixed to a lower end (horizontal portion) of the two U-shaped supporting rods 62 by welding, etc., the axle 10 is attached horizontal to arm portions 75b on the both sides of the back portion 75a, and the wheel 3 rotates around a horizontal axis. Further, the wheel 3 is disposed as an equator of the wheel 3 corresponds to a center line of the hand-pushed mower in plane view.

Further, an auxiliary wheel 71 is disposed on both of right and left side positions of the wheel 3 through elastic supporting material 70 as to elastically move in a vertical direction. To describe this more concretely, a piece 70a of plate spring member (the elastic supporting material 70) bent into an L in cross section is attached to an outside of the arm portion 75b of the bracket 75, and the auxiliary wheel 11 is attached to a forth end of another piece 70b as to rotate. The piece 70b of the elastic supporting material 70 is horizontal in the normal state.

And, height of a lower face of the auxiliary wheel 71 is set to be approximately equal to or slightly higher than height of a lower face of the wheel 3.

The auxiliary wheels 71 on the both sides are disposed sufficiently out of the frame 2 of the hand-pushed mower, namely, outer than the forth ends of the grip portions 60 of the handle 4. And, strength of the elastic supporting material 70, namely, spring constant, strong enough to prevent the mower from falling down on the side when the mower is not supported by a person, is set as the forth end portion of the elastic supporting material 70, of which base end is on the bracket 75 side, elastically deforms to escape upward (in directions shown with arrows) when the auxiliary wheel 71 runs onto a convex portion on the ground to keep the original position (a position before running onto the convex portion) of the mower.

Therefore, with the one wheel 3 of large width, the blade 5 is swung right and left with further ease with improved maneuverability, and the position of the mower is kept by the auxiliary wheels 71 without falling down on the side.

The fourth embodiment has a construction common to the third embodiment in which the hand-pushed mower is provided with the frame 2 to which the engine 1 is attached (held), the wheel 3, the handle 4 disposed on the upper end 23a of the frame 2 and having the grip portions 60 the worker grips with hand, and the mowing blade 5 driven by the engine 1 to rotate. Description of the rest of the members is omitted because they are similarly constructed as in the third embodiment.

According to the hand-pushed mower of the present invention, with the barrel-shaped wheel 3 having large width L, the mower is moved smoothly, by a small pushing force, across an the ground G having many concaves, convexes, and pebbles without getting stuck on the concave.

The wheel 3 is pushed smoothly by manpower to proceed (or recede) with the front part and the rear part well balanced. And, the worker, gripping the grip portion 60 of the handle 4, can operate with ease in lateral, vertical, and longitudinal direction because the mower is well balanced on the contact point of the wheel 3 as a supporting point, and mow the grass regularly (beautifully) with the position of the mowing blade 5 (the rotation plate 49) slightly changed. The worker can mow the grass beautifully as he/she intends without driving source for running and with high safety.

And, with the barrel-shaped wheel 3 having large width L, the mower is moved smoothly by small pushing force on the ground G having many concaves, convexes, and pebbles, and the wheel 3 is not stuck to the concave and the mower does not laterally incline or stagger.

Further, the mower is moved stably on the ground G having many concaves, convexes, and pebbles, and operated and running stably on the inclined ground G without falling by making the width W of the pair of wheels large.

And, the mower can run on the narrow ground G such as a path between fields by making the width W small.

And, according to the hand-pushed mower of the present invention, with one wide wheel 3, the mowing blade 5 is swung with further ease for improved maneuverability, and operationality is enhanced. And, the position of the hand-pushed mower is kept by the auxiliary wheels 71 without falling on the side.

The handle 4 can be swung easily with one hand and mowing in wide trace is easily conducted with swinging the blade 5 because the forth end 26a side on which the handle 4 is gripped is vertical. Further, the handle 4 serves as a leg for raising the blade 5 when the forth end 26a contacts the ground G.

And, the mower can correspond to the height of the worker, and mowing under low trees as in an orchard is made easy because the height of the forth end 26a side on which the handle 4 is adjustable.

With the blade height adjuster 38, the blade 5 is kept at the desired blade height H with the three-point support on the right and left wheels 3 and the sliding plate 37, and the grass is cut into a regular height as in flat mowing of lawn.

Mowing on the side of paths and banks is easily conducted with the adjustable blade angle θ, for example, adjusted to near 90°.

The mower can run on the ground G lightly for low resistance on the ground G. And, the mower can be turned lightly and swiftly.

And, the width L is sufficiently increased with the barrel-shaped hollow wheel 3, the mower is moved smoothly by small pushing force on the ground G having many concaves, convexes, and pebbles, and the wheel 3 is not stuck to the concave and the mower does not laterally incline or stagger. Further, the wheel is easily mass-produced with low cost by blow molding, light-weight, keeping sufficient strength and rigidity as a shell construction, and excellent in durability.

And, the blow-molded hollow barrel-shaped wheel 3 can be certainly attached to the axle 10 as to have stable position. The axle 10, although has a small diameter, strong enough because excessive force does not work on the axle 10.

Further, the mower is made lighter. The concave-convex pattern on the wheel 3 is easily formed with low cost, and strength and rigidity of the wheel 3 is improved further (because the concave-convex pattern has a function as ribs).

While preferred embodiments of the present invention have been described in this specification, it is to be understood that the invention is illustrative and not restrictive, because various changes are possible within the spirit and indispensable features.

What is claimed is:

1. A hand-pushed mower comprising
a frame holding an engine,
a wheel disposed on a lower end of the frame,
a handle disposed on an upper end of the frame, and
a mowing blade disposed in front of the wheel and rotated by the engine,
wherein the wheel is formed barrel-shaped with sides of the wheel curved concave to a barrel axis of the wheel, within a plane containing the barrel axis,
wherein the barrel-shaped wheel rotates on an axle passing through the barrel-shaped wheel along the barrel axis, and
wherein the wheel is disposed at a middle position in a longitudinal direction between the mowing blade at a front position and a handle grip portion at a rear position, whereby a whole weight of the mower is supported on a single contact point of the wheel on the around as a supporting point, as in a balance, and the worker grips the grip portion of the handle and pushes the mower to freely move.

2. The hand-pushed mower as set forth in claim 1, comprising a pair of right and left wheels disposed on the lower end of the frame.

3. The hand-pushed mower as set forth in claim 1, wherein exactly one wheel is disposed on the lower end of the frame.

4. The hand-pushed mower as set forth in claim 1, wherein the wheel comprises exactly one wheel in a middle position in the longitudinal direction and an auxiliary wheel is disposed on both of right and left sides of the wheel through elastic supporting material, so as to elastically move up and down.

5. The hand-pushed mower as set forth in claim 1, wherein the end of the handle extends vertically.

6. The hand-pushed mower as set forth in claim 1, wherein an angle adjusting mechanism is disposed on a connecting portion of a base end of the handle and the upper end of the frame, and a height of the forth end side of the handle is adjusted by adjustment of an inclination angle of the base end side of the handle with the angle adjusting mechanism.

7. The hand-pushed mower as set forth in claim 1, wherein the mowing blade rotated by the engine is attached to a forth end of a holding rod protruding from the engine, so as to protrude forward and downward, an expandable and contractable blade height adjuster includes a sliding plate sliding on the ground, and the blade height adjuster is mounted directly to a middle portion of the holding rod, and blade height is adjustable by the blade height adjuster.

8. The hand-pushed mower as set forth in claim 1, wherein the mowing blade rotated by the engine is attached to a forth end of a holding rod, protruding from the engine as to protrude forward and downward, wherein an axis of rotation of the mowing blade is rotatable around the holding rod.

9. The hand-pushed mower as set forth in claim 1, wherein a thickness of the hollow barrel-shaped wheel is entirely uniform, and an anti-skid concavo-convex pattern is formed with the uniform thickness.

10. A hand-pushed mower comprising a frame holding an engine, a wheel disposed on a lower end of the frame, a handle disposed on an upper end of the frame, and a mowing blade disposed in front of the wheel and rotated by the engine,
wherein the wheel is formed barrel-shaped, and
wherein the barrel-shaped wheel rotates on an axle passing through the barrel-shaped wheel along a barrel axis, and
wherein the barrel-shaped wheel is formed with sides of the wheel curved concave to the axis, within a plane containing the axis, and
wherein exactly one wheel is disposed in a middle position on the lower end of the frame and an auxiliary wheel is disposed on both of right and left sides of the wheel through elastic supporting material, so as to elastically move up and down.

11. A hand-pushed mower comprising a frame to which an engine is attached, a wheel, a handle having a grip portion which a walking worker grips, and a mowing blade rotated by the engine, wherein the mowing blade rotates in a horizontal plane, wherein the wheel is formed barrel-shaped and is disposed at a middle position in a longitudinal direction between the mowing blade at a front position and the grip portion at a rear position, wherein the barrel-shaped wheel rotates on an axle passing through the barrel-shaped wheel along a barrel axis, and a whole weight of the mower is supported on a contact point of the wheel on the ground as a supporting point, as in a balance, and the worker grips the grip portion of the handle and pushes the mower to freely move, wherein exactly one wheel is disposed in a middle position on the lower end of the frame and an auxiliary wheel is disposed on both of right and left sides of the wheel through elastic supporting material, so as to elastically move up and down.

12. A hand-pushed mower comprising a frame holding an engine, a wheel disposed on a lower end of the frame, a handle disposed on an upper end of the frame, and a mowing blade disposed in front of the wheel and rotated by the engine, wherein the wheel is formed barrel-shaped, and wherein the barrel-shaped wheel rotates on an axle passing through the barrel-shaped wheel along a barrel axis, and wherein the barrel-shaped wheel is formed with sides of the wheel curved concave to the axis, within a plane containing the axis, and wherein the wheel is formed as a hollow barrel by blow molding of synthetic resin, and wherein a pair of right and left wheels is disposed on the lower end of the frame, and the pair of right and left wheels is attached to an axle, and wherein a width of the pair of right and left wheels is adjustable.

13. A hand-pushed mower comprising a frame holding an engine, a wheel disposed on a lower end of the frame, a handle disposed on an upper end of the frame, and a mowing blade disposed in front of the wheel and rotated by the engine, wherein the wheel is formed barrel-shaped, and wherein the barrel-shaped wheel rotates on an axle passing through the barrel-shaped wheel along a barrel axis, and wherein the barrel-shaped wheel is formed with sides of the wheel curved concave to the axis, within a plane containing the axis, and wherein the wheel is formed as a hollow barrel by blow molding of synthetic resin, right and left side plate portions are formed concave inward as a top and a bottom of the barrel, a respective bearing of a pair of bearings is fitted to each of the side plate portions, and an axle is inserted through each bearing to hold the wheel as a double-held beam.

14. The hand-pushed mower as set forth in claim 1, 10, 11, 12, or 13, wherein the mowing blade rotated by the engine is attached to a forth end of a holding rod protruding from the engine, so as to protrude forward and downward, a blade height adjuster to adjust blade height is mounted directly to a middle portion of the holding rod, and the blade height adjuster includes a sphere rolling on the ground, many small spheres supporting the sphere to freely roll, and a semi-spherical shell receiving member to form a gap with an upper spherical face of the sphere and to hold the many small spheres in the gap.

* * * * *